United States Patent Office 3,153,632
Patented Oct. 20, 1964

3,153,632
POWER TRANSMISSION FLUIDS
Stanley R. Sprague, East Alton, and Richard G. Cunningham, Edwardsville, Ill., assignors to Shell Oil Company, New York, N.Y., a corporation of Delaware
No Drawing. Filed June 15, 1960, Ser. No. 36,112
8 Claims. (Cl. 252—75)

This invention relates to improved power transmission fluids and lubricants. More particularly it relates to a new composition of power transmission fluid for hydrokinetic drive mechanisms meeting requirements of automatic transmission fluid such as Type A transmission fluid, transaxle fluid and rear axle fluid and various other mechanical equipment.

Rigorous requirements have been set up to qualify fluids for this service. These include wide temperature stability at both high and low temperatures and a pour point of —40° F. maximum to insure proper pumpability and fluidity at low temperatures. The fluid must not have a detrimental effect on parts with which it comes in contact, such as metal surfaces, e.g., copper, and solid organic surfaces such as rubber, organic resins and the like. The fluid must possess excellent anti-frictional and extreme pressure characteristics to afford proper lubrication of gears, clutch plates and other parts of automotive equipment. Also, the fluid must not cause chattering, squawking, squealing or produce other noises caused by the stick-slip phenomenon of clutch plates or other parts of these mechanisms.

Now, in accordance with the present invention, a multifunctional power transmission fluid is provided, which satisfactorily meets the above requirements, and which comprises a mineral oil base containing minor, but critical, amounts of certain essential additives which when used in combination produce an unexpectedly effective power transmission fluid. The additives are: (1) an oil-soluble copolymer of a cyclic amido (lactam) compound such as an N-vinylbutyrolactam and at least one copolymerizable organic compound having an oil-solubilizing hydrocarbyl group, (2) a halo and nitro substituted hydroxy aromatic compound, (3) a salt of a haloorgano phosphono compound, and (4) an oil-soluble sulfur or a sulfur-chlorine containing organic extreme pressure compound.

The oil-soluble copolymer is a copolymer of a polylactam such as a copolymer of an N-vinylbutyrolactam and another copolymerizable organic compound such as unsaturated esters, ethers, amines, hydrocarbons or mixtures thereof. Examples of N-vinyl butyrolactams include N-vinyl pyrrolidone, N-(1-methylvinyl) pyrrolidone, N-vinyl-5-methyl pyrrolidone, N-vinyl-3,3-dimethyl pyrrolidone, N-vinyl-5-ethyl pyrrolidone, N-vinyl-4-butyl pyrrolidone, N-ethyl-3-vinyl pyrrolidone, N-butyl-5-vinyl pyrrolidone, N-vinyl-5,5-dimethyl pyrrolidone, N-vinyl-3,3-dimethyl-5-methoxy pyrrolidone, 3-vinyl pyrrolidone, 4-vinyl pyrrolidone, 5-vinyl pyrrolidone and 5-cyclohexyl-N-vinyl pyrrolidone. Other N-vinyl-cyclic nitrogen-containing compounds are N-vinyl piperidone, N-vinyl-6-methyl piperidone, N-vinyl-3-methyl piperidone, N-(1-methylvinyl) piperidone, N-methyl-6-vinyl piperidone and N-vinyl caprolactam and the like.

The other copolymerizable materials include unsaturated esters of unsaturated acids, e.g., acrylic, methacrylic, fumaric, maleic acids and long-chain alkanols, e.g., $C_{12-18}$ alkanols or esters of unsaturated alcohols, e.g., vinyl alcohol and long chain fatty acids having from 12 to 18 carbon atoms, e.g., lauric or stearic acids. Esters of this type include lauryl acrylate, lauryl methacrylate, stearyl acrylate, stearyl methacrylate, cetyl methacrylate, lauryl fumarate, cetyl fumarate, stearyl maleate, vinyl laurate, vinyl stearate and mixtures thereof.

Polymerizable ethers which may be used should preferably contain at least 12 carbon atoms and be oil-soluble and can be exemplified by vinyl lauryl ether.

The unsaturated hydrocarbons which may be used as copolymeric material may be long chain alpha-olefins such as $\alpha$-$C_{8-22}$ olefin, e.g., octene-1, decene-1, dodecene-1, hexadecene-1, octadecene-1 and eicosene-1 or mixture of these alpha-olefins and short chain olefins such as ethylene, propylene, styrene, isoprene, etc.

The copolymers can be prepared by any suitable means preferably in the presence of a polymerization initiator such as a peroxide or azo compound, in the presence or absence of an inert solvent, such as a hydrocarbon, under a blanket of an inert gas, such as nitrogen or carbon dioxide, and at a temperature ranging from ambient room temperature (about 20° C.) or lower, to about 180° C. or higher, preferably from 50° C. to 150° C., for a period of from about 2 to 28 hours, giving molecular weights of the polymer varying from $5 \times 10^4$ to $2 \times 10^6$ and preferably ranging from $7.5 \times 10^4$ to $10^6$ or from $10^5$ to $8 \times 10^5$. The molecular weight of the polymers is determined by the light scattering technique described in Chemical Reviews, vol. 40, page 319 (1948).

Various combinations of conditions may be employed to maintain the molecular weight within the desired range. Factors which exert an influence on the molecular weight of the polymer include the method of polymerization (e.g., polymerization in emulsion, suspension, solvent solution or bulk), the nature and concentration of the catalyst employed, the temperature, and nature and amount of the particular monomers. When the polymerization is accomplished in solution, the molecular weight of the product will be lower when the dilution is higher, e.g., when the proportion of solvent is greater. With the same catalyst, the higher polymerization temperature tends to give lower molecular weight polymers.

The following examples illustrate the preparation of suitable polymers for use in oil compositions in accordance with the invention.

EXAMPLE I

A mixture of about 2 mols of lauryl methacrylate, 1 mol of N-vinyl pyrrolidone and 0.5% by weight of benzoyl peroxide was reacted in a suitable reaction vessel for a period of about 10 hours at about 65° C. The polymer was then dispersed in benzene and thereafter precipitated with a mixture of acetone and methanol. A copolymer of lauryl methacrylate/N-vinyl pyrrolidone having a nitrogen content of 2.20% by weight and a molecular weight in excess of 250,000 was recovered. The polymer contained the monomer units essentially in the ratio as provided in the mixture; it had an alkane chain of about 2400 carbon atoms carrying about 800 lauryloxyformyl groups and about 400 butylolactam groups.

EXAMPLE II

A copolymer of lauryl methacrylate and N-vinyl pyrrolidone was prepared by the method of Example I with the same monomer ratio but in which 0.75% by weight of alpha, alpha-azodiisobutylronitrile was used as the catalyst. The molecular weight of the polymer was around 225,000.

EXAMPLE III

A terpolymer of stearyl methacrylate/lauryl methacrylate/N-vinyl pyrrolidone in the mole ratio of 2.8/5.6/1, respectively, was prepared essentially by the method of Example I using 0.2% alpha,alpha-azodiisobutyronitrile as catalyst and the reaction time was 48 hours. The polymeric product was oil-soluble and had an average molecular weight over $1 \times 10^6$ as determined by the light scattering technique.

EXAMPLE IV

When a copolymer of stearyl methacrylate/N-vinyl piperidone, in which the reactants are in a mol ratio of 4:1, respectively, is prepared essentially by the method of Example I, the obtained polymer is oil-soluble and contains the monomer units in the ratio of about 4:1, respectively.

Other representative examples of copolymers include: copolymer of N-vinyl pyrrolidone/cetyl fumarate/stearyl fumarate, copolymer of N-vinyl pyrrolidone/lauryl fumarate, copolymer of N-vinyl pyrrolidone/vinyl stearate, copolymer of N-vinyl pyrrolidone/dodecene-1/lauryl methacrylate, copolymer of N-vinyl pyrrolidone/lauryl fumarate/lauryl methacrylate, copolymer of N-vinyl piperidone/lauryl methacrylate, copolymer of N-vinyl caprolactane/lauryl methacrylate.

The second essential additive is a halo-nitrophenolic compound wherein the halo atom can be chlorine and/or bromine. Compounds of this type include 2-chloro-4-nitrophenol, 4-chloro-2-nitrophenol, 2,6-dichloro-4-nitrophenol, 2-bromo-4-nitrophenol, 2-chloro-4-nitronaphthol and mixtures thereof.

The third essential additive is a haloorganic phosphono salt having one of the formulas

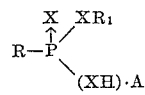
(I)

or

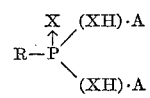
(II)

or

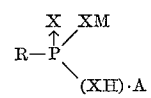
(III)

wherein R is a hydrocarbyl, preferably a halohydrocarbyl having from 1 to 30 carbon atoms, $R_1$ is hydrogen or a $C_{1-4}$ alkyl radical, M is an alkali metal, X is oxygen and/or sulfur and A is an amine, preferably a primary or secondary amine.

The acid portion used to make the salts represented by Formulas I, II or III can be prepared by the Arbuzov method (J. Gen. Chem., USSR 4, 898–900, 1934) or the method described in Can. J. of Chem., vol. 31, pp. 976–83, 1953. Suitable acids include monochloromethylphosphonic acid, 1-monochloroethylphosphonic acid, 1-chloro-2-methyl-propylphosphonic acid, trichloromethanethiophosphinic acid, 1,1-dibromoethanephosphinic acid, 3,3,5-trichlorocyclohexanephosphinic acid, 1,1-dichlorophenylethanephosphonic acid, 3,3,3-tribromopropanephosphonic acid, 1,1-dichlorobutanephosphonic acid, trichloromethanethiophosphonic acid, and 1,1-dibromobutanethiophosphonic acid.

The amines which can be used to form salts of the above phosphorus acids include highly branched primary aliphatic amines or secondary aliphatic amines of at least 8 carbon atoms. Of the highly branched primary aliphatic amines, the tertiary alkyl primary amines are preferred and they can be prepared by any suitable means such as described in the U.S. Office of the Publication Board Report No. 88843. Other highly branched primary amines can be prepared by converting primary branched chain alcohols as produced by the Oxo process from branched chain olefins as fully described by P. W. Sherwood in the Oil and Gas Journal, June 9, 1949, page 71, and in the February 1953 issue of Petroleum Processing, to the corresponding nitriles and converting the nitrile to the amine by catalytic hydrogenation. Another method is to convert alcohols to the corresponding halides and to form the amines derived from the halide in the customary manners such as by reacting with ammonia.

It has been found that the tertiary alkyl primary amines, containing, as the tertiary alkyl radical, the radical of polyisobutylene, polypropylene and mixtures thereof are particularly effective for the present purpose and they constitute a preferred class of amines for the practice of the invention. Accordingly, 1,1,3,3-tetramethylbutylamine (from the amination of diisobutylene), 1,1,3,3,5,5-hexamethylhexylamine (from triisobutylene), 1,1,3,3,5,5,7,7-octamethyloctylamine (from tetraisobutylene) and 1,1,3,3,5,5,7,7,9,9-decamethyldecylamine (from pentaisobutylene) are specific preferred amines which are suitably used individually or as mixtures thereof. In addition to these tertiary alkyl primary amines, primary tertiary alkylmethylamines, such as 2,2,4,4-tetramethyl pentylamine, 2,2,4,4,6,6-hexamethyl heptylamine and the like are suitable.

Other tertiary branched-chain alkyl primary amines which can be used include the $C_8$ and higher amines of this type mentioned in U.S. Patents 2,160,058, 2,606,923 and 2,611,782, such as terttridecylamine.

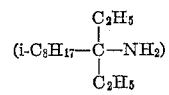

as well as isoheptyldiethylcarbinyl amine, isooctylethylpropylcarbinylamine, and the like. Primary amines of this type are commercially available from Rohm and Haas Company under the trade name of "Primenes," specific products being "Primene 81–R," which is a mixture of primary alkylamines containing from about 12 to 15 carbon atoms and "Primene JM–R," which is a similar tertiary alkylamine mixture containing an average of about 18 to 24 carbon atoms.

The following are the properties of some amines which can be used to form the amine salts.

*Table 1.—Properties*

| | Tertiary Octylamine | Alkylamine 81, $A_1$ | Alkylamine JM, $A_3$ |
|---|---|---|---|
| Formula | t-$C_8H_{11}NH_3$ | Principally t-$C_{12}H_{25}NH_2$ to t-$C_{15}H_{31}NH_2$. | Principally t-$C_{18}H_{37}NH_2$ to t-$C_{24}H_{49}NH_2$. |
| Molecular Weight | 128 | Principally 185–227 | Principally 269–353. |
| Average Molecular Weight | 131 | 191 | 301. |
| Specific Gravity, 25° C | 0.771 | 0.812 | 0.828. |
| Refractive Index, 25° C | 1.423 | 1.447 | 1.455. |
| Boiling Point (or range) | 137–143° C. (760 mm.) | 5–90% at 210–227° C. (760 mm.). | 5–95% at 275–340° C. (785 mm.). |

The secondary amines which can be used to form salts of the phosphorus acids include secondary amines, preferably aliphatic and cycloaliphatic amines, containing from 10 to 36 carbon atoms. Illustrative of such amines are diamylamine, dihexylamine, di(2-ethylhexyl) amine, dioctylamine, didecylamine, didodecylamine, ditertradecylamine, dihexadecylamine, dioctadecylamine, dibromodioctadecylamine, isopropyloleylamine, diricinoleylamine, butylricinoleylamine, butyl-2-ethylhexylamine, dilaurylamine, methyloleylamine, ethyloctylamine, isoamylhexylamine, dicyclohexylamine, dicyclopentylamine, cyclohexyloctylylamine, cyclohexylbenzylamine, benzyloctylamine, benzyl-2-ethylhexylamine, allyloctylamine, dodecyl - 2-ethylhexylamine, (1-isobutyl-3-methylbutyl)-3,3,5 - methylcyclohexylamine, di(1-isobutyl-3-methylbutyl) amine, N,n - tetradecyldiethylenetriamine, octylethylene diamine, N-2-ethylhexyl N-hexadecyl triethylene tetramine, heptyl trimethylene diamine, N-tetradecyl tripropylene tetramine, N,N'-diallyl trimethylene diamine, 3-hexylmorpholine, and the like.

The mixed alkali metal-amine salts (III) are prepared from the full amine salts represented by Formula II by treating a full amine salt in a low boiling solvent such as methanol with an alkali metal such as sodium, potassium or lithium hydroxide, carbonate, alcoholate, e.g., methylate, in an amount sufficient to replace one of the amine groups with an alkali metal. The mixture is warmed while stirring and when the reaction is complete the temperature is increased to boil off the solvent, e.g., methanol, and it may be necessary to strip the product with nitrogen to remove last traces of the solvent. An alternative method of preparing the alkali metal-amine salts such as sodium-amine phosphonate is to dissolve sodium in methanol and add the sodium methylate dropwise, while stirring, to full amine salt of an alkyl phosphonic acid at 100–200° C. for ½ to 10 hours. The methanol is removed by nitrogen stripping to give a new sodium-amine phosphonate.

For example (I), 0.5 gram of sodium was dissolved in 25 ml. of methanol and this was added dropwise with Stirring to $C_{18-24}$ primary alkylamine (mixture $A_3$ of Table I) salt of monochloromethylphosphonic acid. The addition was carried out at 165° F. and required about 20 minutes after which the mixture was held at this temperature for 30 minutes. The methanol was removed with nitrogen stripping to give a clear product containing 0.11% wt. sodium.

Examples of amine salts include the partial neutral primary highly branched-chain amine salts of phosphorus acids having a P-C linkage include: $t-C_{12}H_{25}NH_2$, $t-C_{12}H_{25}NH_2$ to $t-C_{15}H_{31}NH_1$, $t-C_{18}H_{37}NH_2$ to $C_{24}H_{49}NH_2$, dimethyl neopentylcarbinyl amine, terttridecylamine salts of trichloromethanephosphonic acid, 1,1-dichloroethanephosphonic acid, 1,1 - dibromobutanephosphonic acid, trichlorobenzenephosphonic acid, tribromomethanephosphonic acid, trifluoromethanephosphonic acid, tribromomethanephosphonic acid, trichloromethane - dithiophosphonic acid, chlorobenzene trichloromethanephosphinic acid, 1,1-dichloroethanethiophosphinic acid, trichlorobenzenephosphonic acid, trichloromethanephosphinic acid, and dibromoethanephosphinic acid.

The secondary amine salts which are specifically preferred include: di - 2 - ethylhexylamine, di-1-isbutyl-3-methylbutylamine, didecylamine, dioctadecylamine, isopropyloleylamine, butyl-2-ethylhexylamine, dicyclohexylamine, 1,1-dichloroethanephosphonic acid, 1,1-dibromobutanephosphonic acid, trichlorobenzenephosphonic acid, tribromomethanephosphonic acid, trifluoromethanephosphonic acid, tribromomethanephosphonic acid, trichloromethane-dithiophosphonic acid, chlorobenzene trichloromethanephosphinic acid, 1,1 - dichloroethanethiophosphonic acid, trichlorobenzenephosphonic acid, trichloromethanephosphinic acid, dibromoethanephosphinic acid, and mixtures thereof.

The alkali metal-amine salts include mixed salts of sodium or potassium with primary amines such as $t-C_{12}H_{25}NH_2$, $t-C_{12}H_{25}NH_2$ to $t-C_{15}H_{31}NH_1$, $t-C_{18}H_{37}NH_2$ to $C_{24}H_{49}NH_2$, dimethyl neopentylcarbinyl amine, terttridecylamine, or with secondary amines, e.g., di-2-ethylhexylamine, di - 1-isobutyl-3-methylbutylamine, didecylamine, dioctadecylamine, isopropyloleylamine, butyl-2-ethylhexylamine, dicyclohexylamine salt of trichloromethanephosphonic acid, 1,1-dichloroethanephosphonic acid, 1,1-dibromobutanephosphonic acid, trichlorobenzenephosphonic acid, tribromomethanephosphonic acid, trifluoromethanephosphonic acid, trichloromethane - dithiophosphonic acid, chlorobenzene trichloromethanephosphinic acid, 1,1-dichloroethanephosphinic acid, trichloroethanethiophosphonic acid, trichlorobenzenephosphonic acid, trichloromethanephosphinic acid, and dibromoethanephosphinic acid.

The fourth essential additive is a sulfurized and/or sulfohalogenated fatty material such as animal, vegetable and marine fats and oils and derivatives thereof. Materials of this type can be prepared by the methods described in U.S. Patents 2,322,859, 2,454,034, 2,459,717, 2,467,137, 2,614,078, 2,633,825 and 2,701,237. Among such materials are sulfurized or sulfo-chlorinated fats, fatty oils of the animal, vegetable and marine type and derivatives thereof, such as sulfurized or sulfo-chlorinated tallow, lard, lanolin, jojoba oil, rapeseed oil, sperm oil, fatty acids of these fats and oils as well as their esters such as $C_{14}$ to $C_{20}$ saturated and unsaturated fatty acids, e.g., myristic, stearic, oleic acids, polymerized fatty acids such as polymerized linoleic acid or "Empol 1022" which is a polymerized fatty acid made by Emery Industries; or esters such as cetyl stearate, cetyl oleate and mixtures thereof; halogenated fats, oils, waxes such as chlorinated paraffin wax, chlorinated tallow, etc.; of these materials preferred are the sulfurized and/or sulfurized-chlorinated sperm oil, lanolin, rapeseed oils, oleic acid, chlorinated paraffin wax and cetyl oleate as well as mixtures thereof.

The additives (1), (3) and (4) are used in amounts ranging from about 1% to about 10% each and the additive (2) is used in amounts of from about 0.1% to about 2% preferably from 0.3% to 0.8% by weight.

If desired, minor amounts of secondary additives can be used in conjunction with the four primary additives in compositions of this invention among such additives are amino aryl oxides, such as N,N'-di-sec-butyl aminodiphenyl oxide, N,N'-diisopropylaminodiphenyl oxide, N,N'-distearylaminodiphenyl oxide, etc. Also useful are organo sulfides, such as alkyl, alkaryl, aralkyl, cyclalkyl mono- or disulfide such as amyl, octyl, lauryl, stearyl, butylphenyl, benzyl, cyclohexyl mono-or disulfides, or dilaurylmonosulfide, dibenzyl mono- and disulfide, p-chlorobenzyldisulfide, dicyclohexyl disulfide, di-p-nitrophenyl disulfide; reaction products of phosphorus sulfide and monohydroxy alcohols, olefins, terpenes and metal salts thereof, such as reaction product of $P_2S_5$-terpene sold commercially by Monsanto as Santolube 394–C, the properties of which are: viscosity at 210° F., 145 SUS; specific gravity, 103; phosphorus, 4.75%; sulfur, 12.5%. Zinc or calcium or barium dialkyldithiophosphates derived from alkanols such as methylisobutylcarbinol, isobutyl alcohol, 2-methyl-1-butanol, 3-pentanol and mixture thereof. Preferred are the zinc dialkyldithiophosphates sold by Lubrizol as Lubrizol 1060 and 1360, the properties of which are:

|  | Lubrizol 1060 | Lubrizol 1360 |
| --- | --- | --- |
| Phosphorus, Percent w | 8 | 8 |
| Sulfur, Percent w | 16.6 | 17.0 |
| Zinc | 8.3 | 8.7 |

Antifoaming agents such as silicone polymers, phosphates, esters, e.g., dimethylsilicone polymer, tributyl phosphate and phenolic and/or amine antioxidants can be incorporated into compositions of the present invention, such as alkyl phenols, e.g., di- and trialkyl phenols, for instance, 2,4-, 2,3-, 3,4-, 2,6- and 3,5-diamyl phenol 2,4-dimethyl-6-tert-butyl phenol, 2,4-ditert-butyl-6-methyl phenol; arylamines such as phenyl-alpha-naphthylamine, phenyl-beta-naphthylamine; fatty acids of from 10 to 20 carbon atoms such as lauric, palmitic or stearic acids and mixtures thereof. These auxiliary agents when used in compositions of this invention are employed in amounts of from 0.001% to 10% and preferably between 0.1% and 5%.

Base oils to which agents of this invention are added may be selected from a variety of natural oils such as paraffinic, naphthenic and mixed base oils having a viscosity range such as from 50 SUS at 100° F. up to 250 SUS at 210° F. In addition, synthetic oils may be used such as polymerized olefins, alkylated aromatics; polyalkyl silicone polymers, e.g., liquid dimethyl silicone polymer, other silicone polymers; $H_2S$-adducts of unsaturated ethers and thioethers, e.g., $H_2S$ adduct of diallyl ethers; esters, e.g., di(2-ethylhexyl)sebacate. Mixtures of natural and synthetic oils can be used.

The following compositions illustrate the invention.

Composition A:

| | Percent weight |
|---|---|
| Copolymer of N-vinyl pyrrolidone/lauryl methacrylate (Example I) | 5.0 |
| 2-chloro-4-nitrophenol | 0.5 |
| Sulfurized sperm oil | 2 |
| $A_3$ monochloromethylphosphonate [1] | 1.35 |
| N,N'-di-sec-butylaminophenyl oxide | 0.5 |
| Mineral lubricating oil (MVI 100 SSU at 100° F. neutral) | Balance |

[1] Note Table I about $A_3$.

Composition B:

| | |
|---|---|
| Copolymer of N-vinyl pyrrolidone/lauryl methacrylate | 4.3 |
| $A_3$ monochloromethyl phosphonate | 2.7 |
| Sulfurized sperm oil | 2.0 |
| 4-chloro-2-nitrophenol | 0.5 |
| N,N'-di-sec-butylaminophenyl oxide | 0.5 |
| Mineral oil (MVI 100 SSU at 100° F. neutral) | Balance |

Composition C:

| | |
|---|---|
| Copolymer of N-vinyl pyrrolidone/lauryl methacrylate | 4.3 |
| $A_3$ monochloromethyl phosphonate | 2.7 |
| Sulfurized sperm oil | 2.0 |
| 4-chloro-2-nitrophenol | 0.5 |
| N,N'-di-sec-butylaminophenyl oxide | 0.5 |
| Dibenzyldisulfide | 1 |
| Mineral oil (MVI 100 SSU at 100° F. neutral) | Balance |

Composition D:

| | |
|---|---|
| Copolymer of N-vinyl pyrrolidone/stearyl methacrylate | 5 |
| $Na \cdot A_3$ monochloromethylphosphonate | 2 |
| Sulfurized-chlorinated sperm oil | 2 |
| 2,6-dichloro-4-nitrophenol | 0.1 |
| Mineral oil (SAE 10) | Balance |

Composition E:

| | |
|---|---|
| Copolymer of N-vinyl pyrrolidone/lauryl methacrylate | 4.4 |
| Sulfurized sperm oil | 2 |
| 4-chloro-2-nitrophenol | 2 |
| $A_3$ trichloromethylphosphonate | 2 |
| $P_2S_5$-terpene reaction product | 2 |
| Mineral oil (SAE 20) | Balance |

Composition F:

| | |
|---|---|
| Copolymer of N-vinyl pyrrolidone/lauryl methacrylate | 4.4 |
| Sulfurized sperm oil | 2 |
| 4-chloro-2-nitrophenol | 2 |
| $A_3$ trichloromethylphosphonate | 2 |
| $P_2S_5$-terpene reaction product | 2 |
| Zn dialkyldithiophosphate (Lubrizol 1360) | 2 |
| Mineral oil (SAE 20) | Balance |

Composition B met all physical requirements for Type A and Type $A_1$, Suffix A automatic transmission fluids described in SAE Journal, September 1959, and passed the Powerglide Oxidation Test. In addition this composition passed the Fed. Spec. VV-L-791B, Amendment 1, Method No. 530.8.2, 300° F. oxidation test (300-880 hours), and The Ford Rear Axle Score Test, the conditions being that the axle carriers, containing the test lubricant, were subjected to a 250-mile break-in period. The break-in was run between 30 and 60 m.p.h. car speed, with gradual speed changes to the same load as described below. The rear axle sump oil temperature was held between 150 and 175° F. during the break-in. The score testing procedure is described below.

(1) Five miles of full-throttle acceleration and closed-throttle deceleration between 68 and 75 m.p.h. With 2.91:1 gear ratio this portion of the cycle involves 45 accelerations during the five-mile run.

(2) Full-throttle acceleration from the highest car speed at which the transmission would down shift into intermediate gear to 2 m.p.h. above the up shift to direct drive speed, then closed throttle deceleration back down to the intermediate gear shift point. This was done 20 times. It consisted of 3-2-3 transmission gear shifting.

The second step above immediately followed the first and both of them together constituted one cycle. This cycle was repeated four times or until a failure occurred. A time lapse of approximately five minutes was maintained between cycles. The load conditions applied to the rolls by the dynamometer were 3.6 wheel horsepower at 20 m.p.h. and 37.1 wheel horsepower at 70 m.p.h. The loads applied at the points between and above these speeds fall on a curve similar to a road load curve. The tunnel air velocity in the cell for the score testing was maintained at 55 m.p.h. with a controlled ambient air temperature range between 75 and 85° F. No other effort was made to control the rear axle sump oil temperature. Also in the 4-ball E.P. Tester operated for 10 seconds at 1800 r.p.m. and room temperature using ½ inch diameter grade one steel bearing balls, the above compositions, A, B, C and D carried a weld load (kg.) of 400-650 whereas Composition 1 (mineral oil+5% copolymer, Example I+4.3% copolymer, Example I+2% sulfurized sperm +0.5% 2-chloro-4-nitrophenol) weld load was 224 kg., Composition 2 (mineral oil) weld load was 224 kg. and neat mineral oil weld load was 180 kg. Also in the oxidation test Compositions 1 and 2 deteriorated in less than 70 hours, whereas Compositions A, B, C and D in the oxidation test passed 300 hours.

Compositions of this invention are applicable in various engine and industrial equipment requiring excellent power transmission fluids which possess good lubricating and cooling properties.

We claim as our invention:

1. A power transmission fluid comprising a major amount of mineral oil from about 0.1% to about 10% each of (1) an oil-soluble copolymer of N-vinyl pyrrolidone and a $C_{8-18}$ alkyl methacrylate, having a molecular weight of from $7.5 \times 10^4$ to $10^6$, (2) an oil-soluble primary alkyl amine chloromethyl phosphonate, (3) an oil-soluble sulfurized fatty oil, and (4) a chloro-nitrophenol.

2. A power transmission fluid comprising a major amount of mineral oil from about 0.1% to about 10% each of (1) an oil-soluble copolymer of N-vinyl pyrrolidone and lauryl methacrylate having a molecular weight of from $7.5 \times 10^4$ to $10^6$, (2) primary $C_{8-24}$ alkyl amine chloromethylphosphonate, (3) sulfurized sperm oil, and (4) from 0.1% to 2% of 2-chloro-4-nitrophenol.

3. The composition of claim 2 containing from 0.1% to 2% of a di-$C_{3-18}$ alkyl aminodiphenyl oxide.

4. The composition of claim 2 containing from 0.1% to 2% of N,N'-di-sec-butylaminodiphenyl oxide.

5. The composition of claim 2 containing from 0.1% to 2% of zinc dialkyl dithiophosphate.

6. The composition of claim 2 containing from 0.1% to 2% of a reaction product of $P_2S_5$ and terpene.

7. The composition of claim 2 containing from 0.1% to 2% of a dibenzyl disulfide.

8. A power transmission fluid comprising 4%–5% copolymer of N-vinyl pyrrolidone and lauryl methacrylate having a molecular weight of from $10^5$ to $8 \times 10^5$, 1–5% primary branched-chain $C_{18-24}$ alkylamine monochloromethylphosphonate, 2–4% sulfurized sperm oil, 0.5–2% 2-chloro-4-nitrophenol, 0.5–1%, N,N'-di-sec-butylaminodiphenyl oxide and the balance being a mineral lubricating oil.

References Cited in the file of this patent
UNITED STATES PATENTS

| | | |
|---|---|---|
| 1,988,300 | Clark | Jan. 15, 1935 |
| 2,830,956 | Wasson et al. | Apr. 15, 1958 |
| 2,874,120 | Watson et al. | Feb. 17, 1959 |
| 2,964,479 | Cyba | Dec. 13, 1960 |

FOREIGN PATENTS

| | | |
|---|---|---|
| 760,554 | Great Britain | Oct. 31, 1956 |
| 822,620 | Great Britain | Oct. 28, 1959 |